Dec. 29, 1936.          C. L. EKSERGIAN          2,066,256
                              WHEEL
                        Filed May 9, 1934
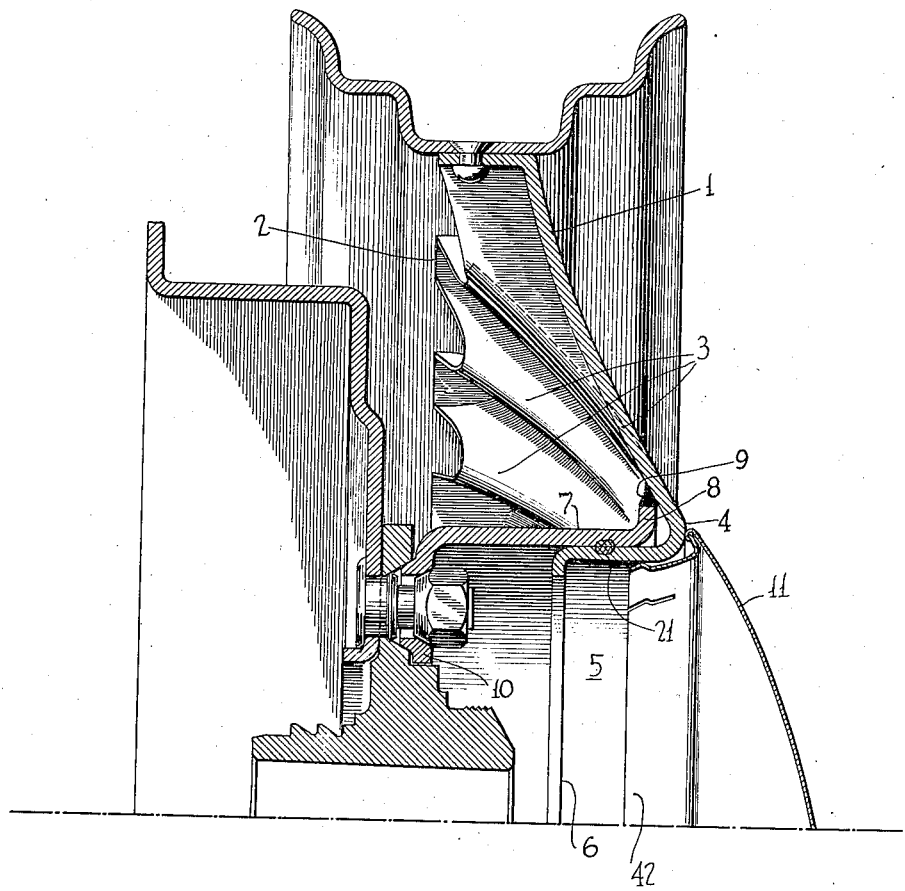
INVENTOR.
CAROLUS L. EKSERGIAN.
BY John P. Tarbox
                    ATTORNEY.

UNITED STATES PATENT OFFICE 2,066,256

WHEEL

Carolus L. Eksergian, Detroit, Mich., assignor to Budd Wheel Company, Philadelphia, Pa., a corporation of Pennsylvania Application May 9, 1934, Serial No. 724,646

4 Claims. (Cl. 301—9)

This invention relates to vehicle wheels and particularly to pressed sheet metal wheels of the artillery type.

Among the objects of the invention are to provide a nave which shall so join or merge into a hub shell portion integral therewith, and so cooperate with another hub shell portion telescopically fitted thereto and having a forward flange, as to provide an outboard extremity of box section and an axial section of great strength at a position subject to ready damage.

Another object is to provide radial flanges on the above-mentioned hub shell portions, which flanges severally, and in cooperation with each other, render the shell highly resistant to load forces.

Another object is to provide a hub shell extension with a bolting-on flange or annulus, which shall be so disposed at one side, preferably the rear side, of the wheel load plane, opposite to that of the forward or other end of the shell, as to further provide desirable new distribution of forces and parts, in a structure which would otherwise be a difficult or ineffective, if not an impossible die-drawing unit; the bolting-on flange, where the body is of the artillery type, being preferably disposed in a plane substantially coincidental with the wheel plane of the rear sides of the spokes.

Advantages of fabrication, assembly, and welding, in addition to rendering the wheel simple and durable in construction, economical to manufacture, effective in its operation and an improvement generally in its field, are still further objects of the invention, as will be better understood from a consideration of the following description and accompanying drawing, in which the figure is an axial section, through a spoke, of a portion of a wheel of the invention.

The structure illustrated includes a hub having a flange, a brake drum, a hub cap, mounting bolts and nuts and a rim; these parts being of usual character and not being particularly germane to the invention, except as associated with it.

More directly connected to the invention is a preferably pressed sheet metal hollow body or spider including rear opening channel spokes 1, to the rear edges 2 of which reference will be had hereinafter more in particular. The body further comprises a conical portion or nave 3 merging, through a front element or nose 4 of arcuate section, into a hub shell portion 5 having a rear radial flange 6 that is preferably at the front side of the wheel load plane, as is the nose 4.

A hub shell member 7 is telescopically fitted with the body hub shell portion 5, these elements thereby being components of a composite shell, of which the portion 5 is a base and the member 7 an extension. The member 7 has a front radial flange section 8 constituting substantially a chord of the arcuate nose section 4, or a span between the nave 3 and its angularly related shell portion 5. An annular preferably arc weld body 9, or other securing means, joins the flange 8 to the adjacent nave and hub shell portions of the body to therewith render the nose 4 of substantially box or tubular axial section, thus rendering it more highly resistant to damage and reinforcing the wheel generally. The flange 6 also assists the flange 8 and the box section nose 4 in reinforcing the mid portion of the wheel against wheel plane load and side stress.

The hub shell extension 7 has a body supporting annulus or bolting-on flange 10 in a plane substantially coincidental with the wheel plane of the rear sides or edges 2 of the spokes 1, this plane being to the rear of the wheel load plane, or at the side of such plane opposite that at which the nose 4 is disposed. This arrangement permits desirable latitude in placing the wheel relative to axially inner parts and provides a hub shell of greater axial depth than would effectually be die drawn from one piece of metal.

The telescopic hub shell elements may be adjusted axially and the box section nose 4 omitted, or the flange 8 and weld body 9 may be variously modified to permit such adjustment and retain the box section, as by making the flange 8 and the weld 9 larger or smaller in diameter, or equivalently modifying the parts.

The wheel body appearance is completed outwardly by a hub cover or cap 11 secured to the wheel body by a snap action. Further securement between wheel body and hub shell may be effected through the intermediation of suitable means such as by way of rivets or welds of any suitable nature, not shown.

While by way of illustration and example I have described my invention in connection with a preferred embodiment thereof as to structure, and the preferred manner of practicing it, it will be obvious to those skilled in the art, after understanding the foregoing, that various changes and modifications may be made without departing from the spirit or scope of the appended claims to cover all such modifications and changes.

What I claim is:

1. An artillery steel wheel comprising a hollow spider including a conical nave merging at the front side of the wheel through an element of arcuate section into a rearwardly extending hub shell portion having a rear inner radial flange at said side, and a hub shell member telescopically fitted over said hub shell portion having a radially inner bolting-on flange at the rear side of said wheel in a plane substantially coincident with the plane of the rear sides of the spider spokes and a front outward radial flange of a section constituting a chord of said arcuate section and annularly welded thereto to therewith render the forward nose of the nave of box section.

2. A vehicle wheel comprising a body including a conical sheet metal portion merging through an element of arcuate axial section at the front side of the wheel into a rearwardly extending hub shell portion having a rear inner radial flange at said side, and a sheet metal hub shell member telescopically fitted over said hub shell portion having a radially inner bolting-on end flange at the rear side of said wheel and a front outward radial flange of a section constituting a chord of said arcuate section and annularly welded thereto to therewith render the forward nose of said conical portion of box section.

3. A vehicle wheel comprising a body including a conical metal wall angularly merging at the front side of the wheel into a rearwardly extending hub shell portion having a rear inner radial flange, and a metal hub shell member telescopically fitted over said hub shell portion having a bolting-on flange at the rear side of said wheel and a front flange of a section spanning the angle between said conical wall and said hub shell portion and secured thereto to therewith render the nose of said conical wall of box section.

4. The vehicle wheel comprising a body including a conical metal wall angularly merging at the front side of the wheel into a rearwardly extending hub shell portion, and a metal hub shell member telescopically fitted over said hub shell portion having a bolting-on flange extending radially inwardly at the rear side of the wheel and a front flange of a section spanning the angle between said conical wall and said hub shell portion and secured thereto to therewith render the nose of said conical wall of box-section.

CAROLUS L. EKSERGIAN.